US012597811B2

(12) United States Patent
Johnson et al.

(10) Patent No.: US 12,597,811 B2
(45) Date of Patent: Apr. 7, 2026

---

(54) METHOD OF HEAT-TREATING ADDITIVELY MANUFACTURED FERROMAGNETIC COMPONENTS

(71) Applicant: General Electric Company, Schenectady, NY (US)

(72) Inventors: Francis Johnson, Clifton Park, NY (US); Mohamed Osama, Garching (DE); Anoop Kumar Jassal, Schenectady, NY (US); Raghavendra Rao Adharapurapu, Bangalore (IN)

(73) Assignee: General Electric Company, Evendale, OH (US)

( * ) Notice: Subject to any disclaimer, the term of this patent is extended or adjusted under 35 U.S.C. 154(b) by 691 days.

(21) Appl. No.: 17/199,793

(22) Filed: Mar. 12, 2021

(65) Prior Publication Data

US 2021/0197273 A1      Jul. 1, 2021

Related U.S. Application Data

(62) Division of application No. 15/949,551, filed on Apr. 10, 2018, now Pat. No. 10,946,444.

(51) Int. Cl.
*C22C 38/10*          (2006.01)
*B22F 3/24*           (2006.01)
(Continued)

(52) U.S. Cl.
CPC ................. *H02K 1/02* (2013.01); *B22F 3/24* (2013.01); *B22F 10/00* (2021.01); *B22F 10/28* (2021.01);
(Continued)

(58) Field of Classification Search
CPC ..... C22C 2202/02; B33Y 10/00; B33Y 40/20; B33Y 80/00; C21D 1/26; C21D 1/28;
(Continued)

(56) References Cited

U.S. PATENT DOCUMENTS

| | | | | |
|---|---|---|---|---|
| 5,501,747 A | * | 3/1996 | Masteller | ................ C22C 38/10 |
| | | | | 148/311 |
| 6,342,108 B1 | | 1/2002 | Lashmore et al. | |

(Continued)

FOREIGN PATENT DOCUMENTS

| | | |
|---|---|---|
| CN | 105772727 A | 7/2016 |
| CN | 106001571 A | 10/2016 |

(Continued)

OTHER PUBLICATIONS

Search Report Corresponding to PCT/US2019/025999 on Jun. 13, 2019.

(Continued)

*Primary Examiner* — Vanessa T. Luk
(74) *Attorney, Agent, or Firm* — Dinsmore & Shohl LLP

(57) ABSTRACT

A method of heat-treating an additively-manufactured ferromagnetic component is presented and a related ferromagnetic component is presented. A saturation flux density of a heat-treated ferromagnetic component is greater than a saturation flux density of an as-formed ferromagnetic component. The heat-treated ferromagnetic component is further characterized by a plurality of grains such that at least 25% of the plurality of grains have a median grain size less than 10 microns and 25% of the plurality of grains have a median grain size greater than 25 microns.

13 Claims, 6 Drawing Sheets

(51) Int. Cl.

| | |
|---|---|
| *B22F 10/00* | (2021.01) |
| *B22F 10/28* | (2021.01) |
| *B22F 10/364* | (2021.01) |
| *B22F 10/38* | (2021.01) |
| *B22F 10/50* | (2021.01) |
| *B33Y 10/00* | (2015.01) |
| *B33Y 40/20* | (2020.01) |
| *B33Y 70/00* | (2020.01) |
| *B33Y 80/00* | (2015.01) |
| *C21D 1/26* | (2006.01) |
| *C21D 6/00* | (2006.01) |
| *C21D 9/02* | (2006.01) |
| *H01F 1/20* | (2006.01) |
| *H01F 41/04* | (2006.01) |
| *H02K 1/02* | (2006.01) |
| *H02K 15/00* | (2006.01) |
| *H02K 15/02* | (2006.01) |
| *H02K 15/12* | (2006.01) |
| *B22F 5/00* | (2006.01) |
| *B22F 10/25* | (2021.01) |
| *B22F 10/64* | (2021.01) |
| *C22C 19/07* | (2006.01) |
| *C22C 33/02* | (2006.01) |
| *H02K 7/00* | (2006.01) |

(52) U.S. Cl.
CPC ............ *B22F 10/364* (2021.01); *B22F 10/38* (2021.01); *B22F 10/50* (2021.01); *B33Y 10/00* (2014.12); *B33Y 40/20* (2020.01); *B33Y 70/00* (2014.12); *B33Y 80/00* (2014.12); *C21D 1/26* (2013.01); *C21D 6/007* (2013.01); *C21D 9/02* (2013.01); *C22C 38/10* (2013.01); *H01F 1/20* (2013.01); *H01F 41/04* (2013.01); *H02K 15/00* (2013.01); *H02K 15/02* (2013.01); *H02K 15/12* (2013.01); *B22F 2003/248* (2013.01); *B22F 2005/004* (2013.01); *B22F 10/25* (2021.01); *B22F 10/64* (2021.01); *B22F 2301/35* (2013.01); *B22F 2999/00* (2013.01); *C21D 2201/00* (2013.01); *C22C 19/07* (2013.01); *C22C 33/0285* (2013.01); *H02K 7/003* (2013.01)

(58) Field of Classification Search
CPC ........ C21D 1/30; C21D 1/32; C21D 2201/00; C21D 2221/00; C21D 2221/01; C21D 2221/02; C21D 2221/10
See application file for complete search history.

(56) References Cited

U.S. PATENT DOCUMENTS

| | | | |
|---|---|---|---|
| 7,510,766 B2 | 3/2009 | Lemieux | |
| 8,663,399 B2 | 3/2014 | Hasegawa et al. | |
| 2002/0127132 A1 | 9/2002 | Deevi | |
| 2007/0151630 A1 | 7/2007 | Iorio et al. | |
| 2014/0283953 A1 | 9/2014 | Waeckerle et al. | |
| 2015/0041025 A1 | 2/2015 | Wescott et al. | |
| 2015/0266285 A1 | 9/2015 | James et al. | |
| 2016/0151860 A1 | 6/2016 | Engeli et al. | |
| 2016/0203898 A1 | 7/2016 | Johnson et al. | |
| 2016/0203899 A1 | 7/2016 | Zou et al. | |
| 2016/0375492 A1 | 12/2016 | Bencher et al. | |
| 2017/0025214 A1* | 1/2017 | Nishimura | B22F 3/02 |
| 2017/0141625 A1 | 5/2017 | Tangudu et al. | |
| 2017/0154713 A1 | 6/2017 | Simon et al. | |
| 2017/0155309 A1 | 6/2017 | Jassal et al. | |
| 2017/0169945 A1 | 6/2017 | Lambourne et al. | |
| 2017/0213628 A1 | 7/2017 | Chen et al. | |
| 2017/0217093 A1 | 8/2017 | DeMuth et al. | |
| 2017/0236639 A1 | 8/2017 | Pieper et al. | |
| 2018/0016157 A1 | 1/2018 | Chen et al. | |

FOREIGN PATENT DOCUMENTS

| | | | | |
|---|---|---|---|---|
| CN | 106077641 A | 11/2016 | | |
| JP | 2007/282340 A | 10/2007 | | |
| WO | WO-2016023961 A1 * | 2/2016 | ............ | B22F 1/0003 |

OTHER PUBLICATIONS

Written Opinion Corresponding to PCT/US2019/025999 on Oct. 17, 2019.

Garibaldi, The Impact of Additive Manufacturing on the Development of Electrical Machines for MEA Applications: A Feasibility Study, XP055594293, Toulouse France, Feb. 1, 2015, 5 Pages.

Garibaldi, Effect of Annealing on the Microstructure and Magnetic Properties of Soft Magnetic Fe-Si Produced via Laser Additive Manufacturing, Scripta Materialia, vol. 142, XP085203823, Aug. 2, 2017, pp. 121-125.

Kustas et al., Characterization of the Fe—Co-1.5V Soft Ferromagnetic Alloy Processed by Laser Engineered Net Shaping (LENS), Additive Manufacturing, 21, 2018, pp. 41-52.

Lammers et al., Additive Manufacturing of a Lightweight Rotor for a Permanent Magnet Synchronous Machine, IEEE, 2016, 5 Pages.

Sourmail, Evolution of Strength and Coercivity During Annealing of FeCo based Alloys, Scripta Materialia, vol. 51, Issue 6, Sep. 2004, pp. 589-591.

Sourmail, Near Equiatomic FeCo Alloys: Constitution, Mechanical and Magnetic Properties, Progress in Materials Science, vol. 50, Issue 7, Sep. 2005, pp. 816-880.

Wu et al., Annealing Effects on Magnetic Properties of Silicone-Coated Iron-based Soft Magnetic Composites, Journal of Magnetism and Magnetic Materials, vol. 324, Issue 5, Mar. 2012, pp. 818-822.

* cited by examiner

140

140

140

METHOD OF HEAT-TREATING ADDITIVELY MANUFACTURED FERROMAGNETIC COMPONENTS

PRIORITY INFORMATION

The present application claims priority to, and is a divisional application of, U.S. patent application Ser. No. 15/949,551 filed on Apr. 10, 2018, which is incorporated by reference herein.

BACKGROUND

Embodiments of the disclosure generally relate to additively-manufactured ferromagnetic components. More particularly, embodiments of the disclosure relate to a method of heat-treating additively-manufactured ferromagnetic components.

In electrical machines, ferromagnetic components channel magnetic flux. Typical methods of forming ferromagnetic components of an electrical machine, involve multiple steps and multiple parts that are assembled together. Use of multiple steps and multiple parts results in cumbersome manufacturing processes, and may also affect the machine's end performance and reliability. Furthermore, in some topologies, the ferromagnetic components may be structured as insulated laminas compacted together to form a core of the ferromagnetic component. Lamination and insulation may minimize losses such as eddy current losses which may otherwise represent a significant part of energy loss in an electrical machine. However, limitations on the sizes of steel sheets from which laminas are constructed may pose difficulties in assembling multiple laminated components together to form a single component. More complex topologies may decrease losses, increase magnetic flux density, or both, but are difficult to manufacture with conventional methodologies.

Additive manufacturing techniques may be employed to fabricate both laminated and unlaminated ferromagnetic components of an electrical machine. However, additively-manufactured ferromagnetic components may not provide the desired ferromagnetic properties for the end-use application. Thus, there is a need for improved methods of manufacturing additively-manufactured ferromagnetic components for electrical machines.

BRIEF DESCRIPTION

In one aspect, the disclosure relates to a method of heat-treating an additively-manufactured ferromagnetic component such that a saturation flux density of a heat-treated ferromagnetic component is greater than a saturation flux density of an as-formed ferromagnetic component. The heat-treated ferromagnetic component is further characterized by a plurality of grains such that at least 25% of the plurality of grains have a median grain size less than 10 microns and 25% of the plurality of grains have a median grain size greater than 25 microns.

In another aspect, the disclosure relates to a ferromagnetic component, including a plurality of grains such that at least 25% of the plurality of grains have a median grain size less than 10 microns and 25% of the plurality of grains have a median grain size greater than 25 microns. The ferromagnetic component has a unitary structure and a saturation flux density greater than 2 Tesla.

DRAWINGS

These and other features, aspects, and advantages of the present disclosure will become better understood when the following detailed description is read with reference to the accompanying drawings, wherein.

Figure 5:
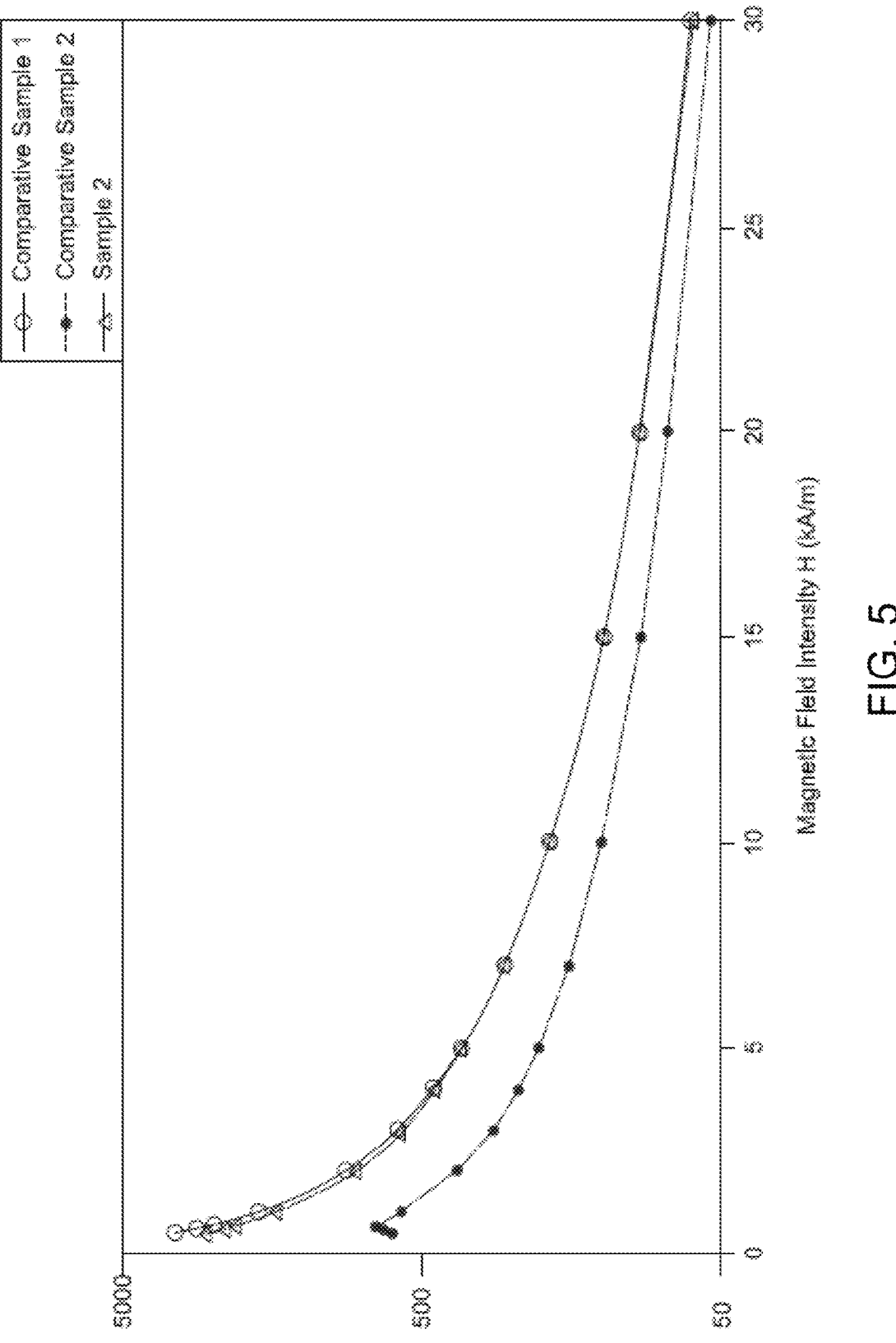
Figure 6:
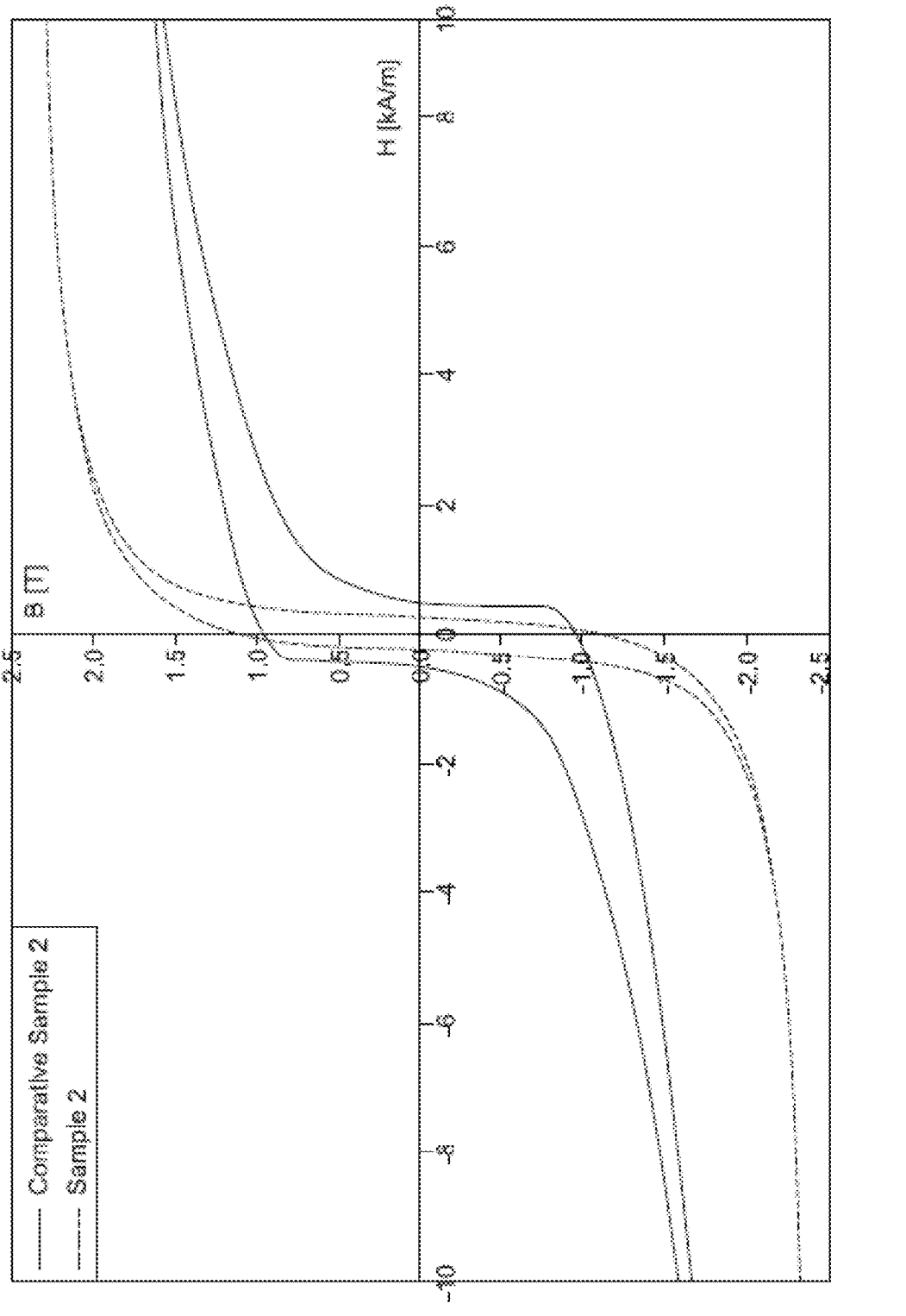

FIG. 5 shows the relative permeability curves for commercially available heat-treated Vacoflux 50 sample (Comparative Sample 1), as-formed additively-manufactured cylindrical sample (Comparative Sample 2), and heat-treated additively-manufactured cylindrical sample (Sample 2); and FIG. 6 shows the static hysteresis loops shape for as-formed additively-manufactured cylindrical sample (Comparative Sample 2) and heat-treated additively-manufactured cylindrical sample (Sample 2).

DETAILED DESCRIPTION

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value solidified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the solidified term. Here and throughout the specification and claims, range limitations may be combined and/or interchanged, such ranges are identified and include all the sub-ranges contained therein unless context or language indicates otherwise.

Solidified microstructures obtained using laser-based additive manufacturing techniques are an example of materials science at extreme—with over million Kelvin per second solidification rates, ultra-fine microstructures, and far-from-equilibrium meta-stable phase formation. Therefore, the microstructures obtained, using typical additive manufacturing techniques, in ferromagnetic materials, especially, grain size, phase stability and grain texture, are not tailored for direct electromagnetic (EM) applications, due to high hysteresis losses.

Embodiments of the present disclosure address the noted shortcomings in the art. Inventors of the present application have unexpectedly found a heat-treatment procedure that provides a surprising ability to improve the magnetic properties of additively-manufactured ferromagnetic components to substantially match the magnetic properties of commercially-produced wrought components. These magnetic properties are attained despite a marked difference in microstructure between the additively-manufactured and wrought components.

In some embodiments, a method of heat-treating an additively-manufactured ferromagnetic component is presented such that a saturation flux density of a heat-treated ferromagnetic component is greater than a saturation flux density of an as-formed ferromagnetic component. The heat-treated ferromagnetic component is further characterized by a plurality of grains such that at least 25% of the plurality of grains have a median grain size less than 10 microns and 25% of the plurality of grains have a median grain size greater than 25 microns.

An additively-manufactured ferromagnetic component, in accordance with the embodiments described herein, is manufactured using an additive manufacturing technique. "Additive manufacturing" is a term used herein to describe a process which involves layer-by-layer construction or additive fabrication (as opposed to material removal as with conventional machining processes). Such processes may also be referred to as "rapid manufacturing processes". The additive manufacturing process forms net or near-net shape structures through sequentially and repeatedly depositing and joining material layers. As used herein the term "near-net shape" means that the additively manufactured structure is formed very close to the final shape of the structure, not requiring significant traditional mechanical finishing techniques, such as machining or grinding following the additive manufacturing process. In certain embodiments, suitable additive manufacturing processes include, but are not limited to, the processes known to those of ordinary skill in the art as direct metal laser melting (DMLM), direct metal laser sintering (DMLS), direct metal laser deposition (DMLD), laser engineered net shaping (LENS), selective laser sintering (SLS), selective laser melting (SLM), electron beam melting (EBM), fused deposition modeling (FDM), or combinations thereof. These methods may employ, for example, and without limitation, all forms of electromagnetic radiation, heating, sintering, melting, curing, binding, consolidating, pressing, embedding, and combinations thereof.

The additive manufacturing processes in accordance with embodiments of the disclosure may be used on suitable metallic materials, e.g., metal alloys, to form the ferromagnetic components of the electrical machine. In some embodiments, the ferromagnetic component includes a soft metal alloy. In some embodiments, the soft metal alloy includes iron and cobalt. In some embodiments, the soft metal alloy further includes silicon, vanadium, or a combination thereof. These materials may be used in these methods and systems in a variety of forms, as appropriate, for a given material and method, including, for example, without limitation, granules, powders, sheets, foils, tapes, filaments, pellets, wires, and combinations of these forms.

Figure 1:
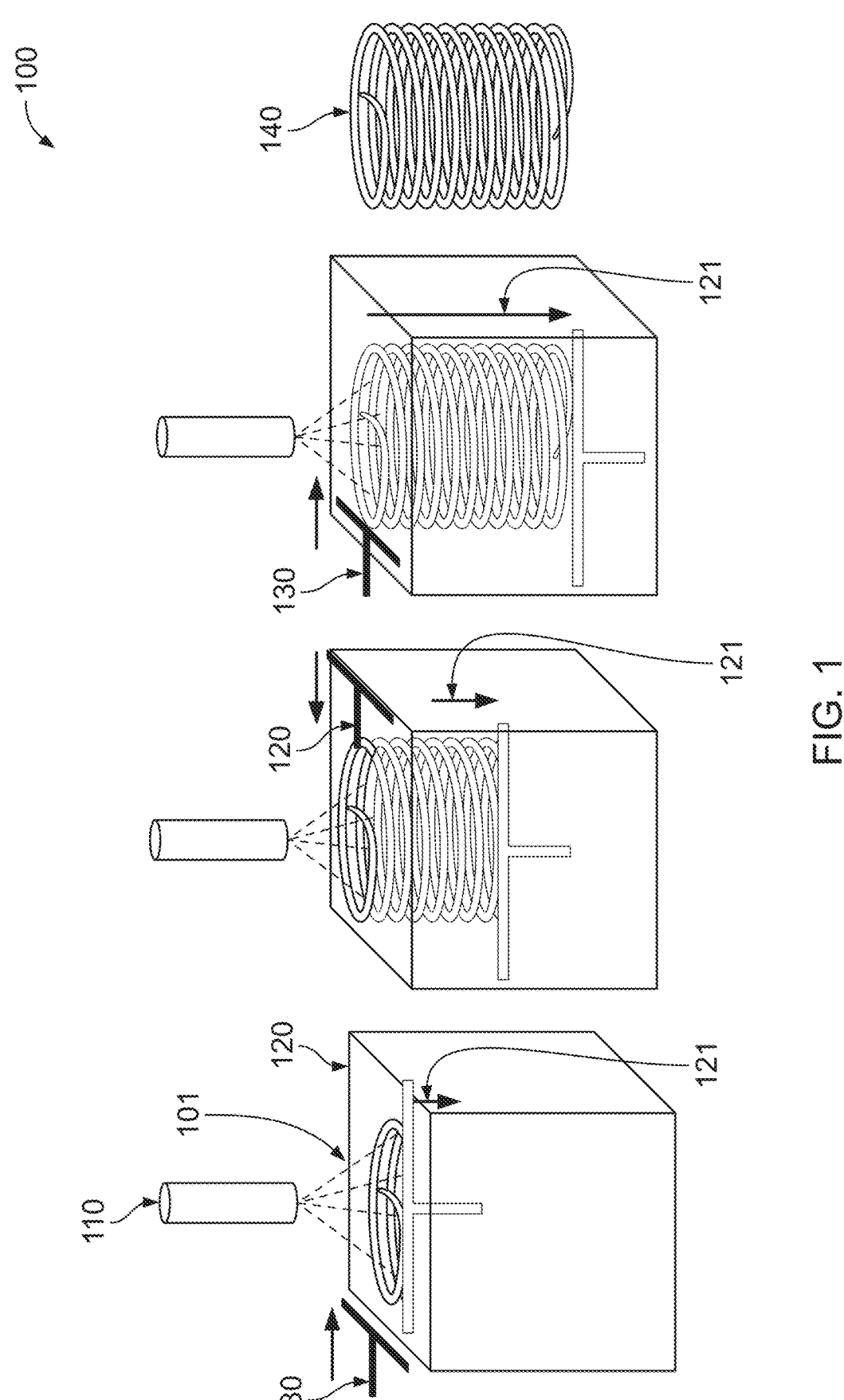
FIG. 1 illustrates a schematic drawing of an additive manufacturing system for manufacturing an additively-manufactured ferromagnetic component, in accordance with some embodiments of the disclosure.

FIG. 1 illustrates a schematic drawing of an additive manufacturing system 100 used for manufacturing an additively-manufactured ferromagnetic component, in accordance with embodiments of the disclosure. Only some components of an additive manufacturing system 100 are shown in FIG. 1 for purposes of simplicity but it would be understood that other components, may also be included. In FIG. 1, an energy source 110 directs an energy beam 101 towards portions of a surface of a bed 120 of a ferromagnetic material. Non-limiting examples of suitable energy beam include laser, electron beam, or a combination thereof. The energy beam 101 fuses a portion of the ferromagnetic material together, whereupon the bed 120 of the ferromagnetic material is lowered in the direction 121 and a fresh layer of ferromagnetic material is deposited thereupon by a suitable applicator 130 (e.g., a roller or a swiping blade). This is typically referred to as one 'build step" of an additive manufacturing process. The terms "fuse" or "fusing" as used herein refer to agglomeration, melting, sintering a portion of the ferromagnetic material to each other, as well as to a portion or portions of underlying ferromagnetic material (if present). By applying successive steps of fusing and depositing, a three-dimensional component 140 is manufactured.

Figure 2C:
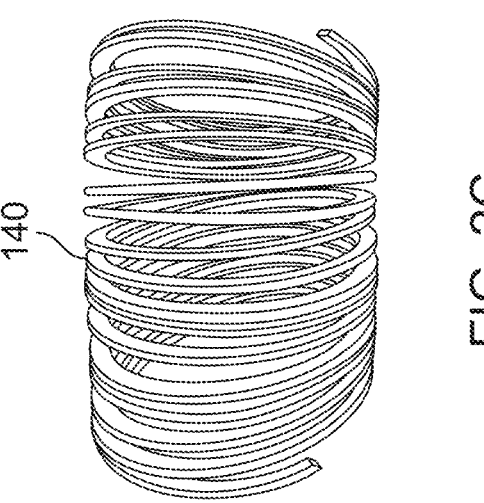
FIG. 2C shows a helical spring ferromagnetic component manufactured using an additive manufacturing technique, in accordance with some embodiments of the disclosure.
Figure 2B:
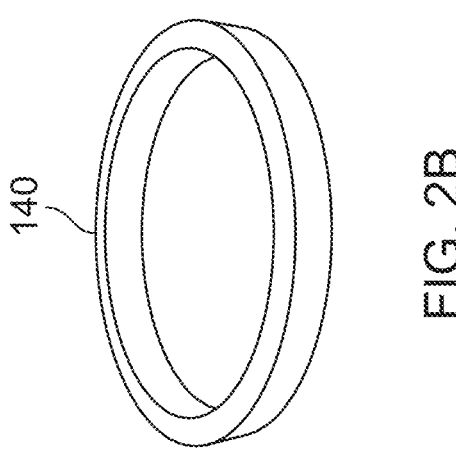
FIG. 2B shows a solid ring ferromagnetic component manufactured using an additive manufacturing technique, in accordance with some embodiments of the disclosure.
Figure 2A:
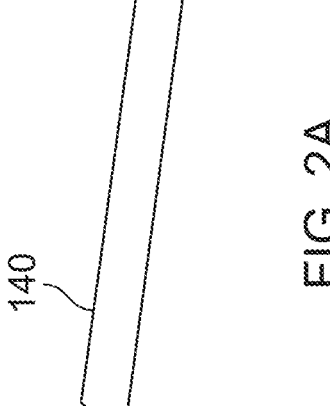
FIG. 2A shows a solid cylindrical ferromagnetic component manufactured using an additive manufacturing technique, in accordance with some embodiments of the disclosure.

In this example, the three-dimensional component 140 is illustrated as helical in shape, however, any other three-dimensional topology suitable as a ferromagnetic component is also encompassed within the scope of the disclosure. Non-limiting examples of other three-dimensional topologies of the ferromagnetic components envisaged within the scope of the disclosure includes rings, cylinders, spirals, and the like. Further, the methods as described herein may be suitable for laminated as well as non-laminated ferromagnetic components. FIG. 2A shows a cylindrical ferromagnetic component 140 manufactured using an additive manufacturing technique, in accordance with some embodiments of the disclosure. FIG. 2B shows a ring cylindrical ferromagnetic component 140, manufactured using an additive manufacturing technique, in accordance with some embodiments of the disclosure. FIG. 2C shows a helical spring ferromagnetic component manufactured using an additive manufacturing technique, in accordance with some embodiments of the disclosure.

In some embodiments, the method in accordance with embodiments of the disclosure further includes providing an additively-manufactured ferromagnetic component, before the heat-treatment step. The term "providing" as used herein includes embodiments wherein the additively-manufactured ferromagnetic component is procured from a suitable source, as well as embodiments wherein the additively-manufactured ferromagnetic component is manufactured, for example, using a technique described in FIG. 1, before the heat-treatment step. Further, the term "additively-manufactured ferromagnetic component" as used herein refers to the final component formed after the additive manufacturing process as well as to the intermediate layers or sub-components formed during the additive manufacturing process. For the sake of brevity, the terms "additively-manufactured ferromagnetic component" and "ferromagnetic component" are used herein interchangeably.

Furthermore, the term "as-formed ferromagnetic component" refers to an additively-manufactured ferromagnetic component that has not be subjected to an additional heat-treatment step besides the fusing steps employed during the additive manufacturing technique, as described hereinabove. Therefore, while referring to FIG. 1, the component 140 may be referred to an "as-formed ferromagnetic component" if it hasn't been subjected to an additional heat-treatment step either during, or, after the additive manufacturing process used to form the component. The term "heat-treated ferromagnetic component" refers to an additively-manufactured ferromagnetic component that has been subjected to at least one additional heat treatment step during, or, after the completion of the additive manufacturing process. The component 140, after being subjected to one or more additional heat-treatment steps (during, or, after the additive manufacturing process) may be referred to as a "heat-treated ferromagnetic component."

In accordance with embodiments of the disclosure, "heat-treating" or "heat-treatment step" refers to holding the ferromagnetic component at a temperature greater than the ferrite-to-austenite transition temperature, for at least 10 min. The heat-treatment may be implemented as isothermal heat treatment, i.e., the ferromagnetic component is subjected to a substantially constant temperature for a certain period of time, or, alternatively, as a cyclic heat treatment wherein the ferromagnetic component is subjected a particular temperature for a particular duration of time, cooled, and then heated again. In some embodiments, the ferromagnetic component is heat treated at a temperature in a range from about 900° C. to about 1200° C. In certain embodiments, the ferromagnetic component is heat treated at a temperature in a range from about 1020° C. to about 1100° C. Further, the heat-treatment is implemented for a time duration in a range from about 1 hour to about 4 hours. In certain embodiments, the heat-treatment is implemented as an isothermal heat treatment at 1100° C. for a time duration of 4 hours.

As noted earlier, inventors of the present application have surprisingly found that after heat-treating the ferromagnetic component at elevated temperatures, although the median grain-size of the grains in the ferromagnetic component increased, there was a wide distribution in grain sizes, with clusters of both small and large grain sizes. The wide distribution in grain sizes is unlike the typical grain distribution seen in commercially-available heat-treated wrought ferromagnetic components. Despite, the differences in microstructure of the heat-treated ferromagnetic components of the present disclosure and the commercially available wrought components, the heat-treated ferromagnetic components unexpectedly showed improved ferromagnetic properties similar to those of the commercially available wrought components.

In some embodiments, the as-formed ferromagnetic component has a median grain size less than or equal to 10 microns and the heat-treated ferromagnetic component has a median grain size greater than or equal to 20 microns. In some embodiments, the as-formed ferromagnetic component has a median grain size less than or equal to 5 microns and the heat-treated ferromagnetic component has a median grain size greater than or equal to 50 microns.

The distribution in grain sizes in the heat-treated additively-manufactured ferromagnetic component can be further characterized by the number fraction of the grains that are smaller than a first grain size and the number fraction of the grains that are larger than a second grain size. As mentioned previously, the heat-treated ferromagnetic component is characterized by a plurality of grains such that at least 25% of the plurality of grains have a median grain size less than 10 microns and 25% of the plurality of grains have a median grain size greater than 25 microns. In some embodiments, at least 25% of the plurality of grains have a median grain size less than 10 microns and at least 50% of the plurality of grains have a median grain size greater than 25 microns.

The heat-treated ferromagnetic component may be further characterized by a median grain size. In some embodiments, the heat-treated ferromagnetic component has a median grain size in a range from about 10 microns to about 50 microns. In certain embodiments, the heat-treated ferromagnetic component has a median grain size in a range from about 10 microns to about 25 microns.

As noted earlier, the saturation flux density of the heat-treated ferromagnetic component is greater a saturation flux density of an as-formed ferromagnetic component. A saturation flux density of an as-formed ferromagnetic component may be, for example, equal to or less than 1.6 Tesla, and the saturation flux density of the heat-treated ferromagnetic component may be greater than 1.6 Tesla. In some embodiments, the saturation flux density of the heat-treated ferromagnetic component is greater than 2 Tesla. In certain embodiments, the saturation flux density of the heat-treated ferromagnetic component is greater than 2.3 Tesla. Heat-treatment of the additively-manufactured ferromagnetic component, in accordance with embodiments of the disclosure, further exhibited increase in saturated relative permeability. In some embodiments, the unsaturated relative permeability of the heat-treated ferromagnetic component is greater than 2000. In certain embodiments, the unsaturated relative permeability of the heat-treated ferromagnetic component is greater than 2500. The heat-treated ferromagnetic components further showed reduction in hysteresis curve area leading to a reduction in hysteresis losses which is reflected in lower specific iron losses [W/kg] at the lower frequency range (hysteresis loss~frequency).

The heat-treatment may be implemented during, or, after the additive manufacturing process. In some embodiments, the heat treatment is performed after the additive manufacturing process. Thus, in such embodiments, while referring to FIG. 1, the additively-manufactured ferromagnetic component 140 is further subjected to one or more heat-treatment steps, as described earlier, to form a heat-treated ferromagnetic component 150.

In some other embodiments, the heat treatment is performed during at least one build step of an additive manufacturing process used to form the additively-manufactured ferromagnetic component. In some such instances, with continued reference to FIG. 1, the heat treatment may be performed using the same directed energy source 110 used during the build step of the additive manufacturing process. This may be applicable to any additive modality that uses directed energy, including laser melting/sintering and electron beam melting. Further, in such instances, the heat-treatment may be performed using for example a beam splitting technique and/or by modulating the power of the directed energy source, during a particular build step. For example, during a build step, after the ferromagnetic material has fused with itself and with underlying layers (if present), the power of the energy source (e.g., laser) may be modulated such that the build layer is heat treated at a desired temperature for a particular time duration. In some such embodiments, the heat treatment may be performed, after each build step, such that subsequent build layers of the ferromagnetic component 140 are heat treated individually. In some other embodiments, the heat treatment may be performed after the last build layer is formed and during the final build step for manufacturing the ferromagnetic component 140.

The methods of heat treating, in accordance with embodiments of the disclosure, cover uniform heat treatment for an entire additively manufactured ferromagnetic component, as well as non-uniform heat treatment. In some embodiments, different portions of the ferromagnetic component may be selectively heat treated to achieve determined saturation flux density and tensile strength values in these portions. The selective heat treatment of ferromagnetic component may be implemented during, or, after the additive manufacturing process. By way of example, in instances where stator laminations integrated with housing/cooling jackets are additively manufactured, only the flux carrying components may be selectively heat treated. Similarly, in instances where a rotor core is additively manufactured with an integrated shaft, only the flux carrying components (i.e., the ferromagnetic components) may be selectively heat treated.

Thus, in accordance with some embodiments of the disclosure, the heat treatment processes as described herein may enable: 1) annealing of ferromagnetic components in-situ, i.e., during the build and/or 2) locally tailoring the magnetic properties by locally controlling the heat treatment during the build. In some embodiments, this may further provide an additive-enabled part count reduction and more cost-effective electric machines used in hybrid electric propulsion.

The method may further include the step of incorporating the heat-treated ferromagnetic component into an electrical machine. Non-limiting examples of suitable electrical machines include a motor, a generator, a transformer, a toroid, an inductor, and combinations thereof. In certain embodiments, an electric machine refers to an electric motor that converts electric power to mechanical power or to an electric generator that converts mechanical power to electric power. The electrical machine in accordance with embodiments of the disclosure may have any suitable topology, for example, a radial, an axial, or a transverse flux topology.

Figure 3:
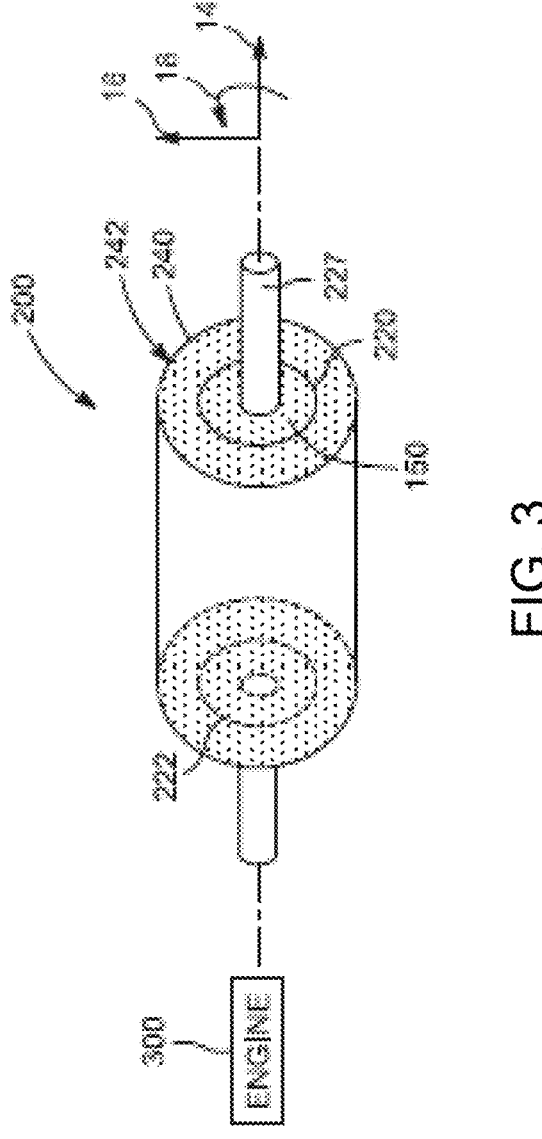
FIG. 3 illustrates a perspective view of an engine coupled to a generator that includes a ferromagnetic component, in accordance with some embodiments of the disclosure.

FIG. 3 is a perspective view of an embodiment of an electric machine 200 (e.g., electric generator 200) coupled to an engine 300 (e.g., an engine of an automobile or an aircraft). While the illustrated electric machine 200 is an electric generator, it may be appreciated that the methods discussed herein are applicable to other electric machines, such as electric motors. In the illustrated embodiment, the electric generator 200 may be described relative to an axial direction 14, a radial direction 16, and a circumferential direction or an annular direction 18. The electric generator 200 includes a rotor assembly 220 and a stator assembly 240. The rotor assembly 220 is configured to rotate in the circumferential direction 10 relative to the stator assembly 240. The rotational energy (e.g., the relative rotation between the rotor assembly 220 and the stator assembly 240) is converted to electrical current in armature or power generation coil within the stator or rotor assembly, depending on the design of the electric generator 200.

The rotor assembly 220 includes a rotor core 222 and is mounted on a shaft 227 such that the rotor core 222 rotates together with the shaft 227. The stator assembly 240 also includes a stator core 242. Further, the rotor assembly 220 and the stator assembly 240 generally both include coil windings. In certain embodiments, the rotor assembly 220 includes field windings that generate a magnetic field, and the stator assembly 240 includes armature or power generation windings that generate electrical power as the rotor assembly 220 rotates. In other embodiments, the stator assembly 240 may include field windings, and rotor assembly 220 may include the armature or power generation windings. In some embodiments, the rotor core 222 includes the heat-treated ferromagnetic component 150, as described herein.

In some embodiments, a ferromagnetic component is also presented. The ferromagnetic component includes a plurality of grains such that at least 25% of the plurality of grains have a median grain size less than 10 microns and 25% of the plurality of grains have a median grain size greater than 25 microns, wherein the ferromagnetic component has a unitary structure and a saturation flux density greater than 2 Tesla.

The term "unitary structure" as used herein refers to a structure wherein all of the structural features of such structure are integral with each other. As used herein, the term "integral" means that the different geometric and structural features that define the unitary structure are formed together as features of a single, continuous, undivided structure, as opposed to previously formed or otherwise manufactured components that are assembled together or otherwise joined or affixed together using one or more of various joining means to yield a final assembled product. Thus, the different structural or geometric features of the unitary structure are not attached to or affixed to each other, e.g., bolted to, welded to, brazed to, bonded to, or the like. A unitary structure in accordance with the embodiments described herein may be formed using an additive manufacturing technique, described in detail earlier.

In some embodiments, the ferromagnetic component includes a soft metal alloy. In some embodiments, the soft metal alloy includes iron and cobalt. In some embodiments, the soft metal alloy further includes silicon, vanadium, or a combination thereof. The ferromagnetic component may be further characterized by a median grain size. In some embodiments, the ferromagnetic component has a median grain size in a range from about 10 microns to about 50 microns. In certain embodiments, the heat-treated ferromagnetic component has a median grain size in a range from about 10 microns to about 25 microns.

In some embodiments, an electrical machine including the ferromagnetic component is also present. FIG. 3 depicts an example of an electrical machine 200 including a heat-treated ferromagnetic component 150, in accordance with embodiments of the disclosure.

Additive manufacturing of ferromagnetic components of electrical machines can enable circumventing complex assemblies of electrical components by building complex near-net-shape geometries, such as manufacturing of radial, axial and transverse flux laminated ferromagnetic parts. Additional benefits include thermal management via incorporating intricate cooling channels, weight reduction due to the ability to manufacture intricate details that are not possible with conventional machining/subtractive processes. Additive manufacturing might also allow reducing the number of parts in an electric machine by eliminating connection components (such as bolts, rivets, brackets etc.) and/or eliminating joining processes (such as brazing, soldering, gluing etc.). Further, additive manufacturing of electric machine components may enable dramatic reductions in cycle time for development; and. manufacturing costs may be reduced by avoiding the need for expensive tooling and iterative modification of the tooling. However, as mentioned earlier, the microstructure, especially, grain size, phase stability and grain texture, of additively-manufactured ferromagnetic components is not tailored for direct electromagnetic (EM) applications due to high hysteresis losses.

By employing heat-treatment procedures on additively-manufactured ferromagnetic components, in accordance with embodiments of the disclosure, the required combination of ferromagnetic properties such as, higher saturation flux density, higher relative permeability, and lower hysteresis losses may be attained.

Further, locally heat treating the ferromagnetic material during the additive manufacturing process offers the machine designer the flexibility to effectively tailor the material performance to meet both magnetic and mechanical performance requirements. For example, regions of the ferromagnetic component subjected to high mechanical stress, but low magnetic flux change, could be locally heat treated to have high tensile strength. Regions that are mechanically static but have high frequency flux change could thus be heat treated to have low losses. The capability provided by some of the embodiments of the disclosure may therefore open up the design space to include machine topologies with both high-power density and high efficiency. The benefits may accrue to the balance of systems in the product, such as simpler thermal management systems and lighter structural support members.

EXAMPLES

The powder material for the additive manufacturing process was supplied by Sandvik Osprey Ltd. (Neath, UK). The chemistry of the alloy was 50Fe-49.9Co-0.1Si (wt % nominal) and 49.5Fe-50.49Co-0.01Si (wt % actual), and the powder size was −53 μm+15 μm (96.4%). The powder was used to build spiral laminates using laser-based additive manufacturing technique, as shown in the FIGS. 1 and 2C. The spiral laminates had an outer diameter of 50 mm, an inner diameter of 43 mm, and had 18 layers, each 0.47 mm thick. Additionally, two other solid samples were manufactured using additive manufacturing, as shown in FIG. 2A (solid cylinder sample) and FIG. 2B (solid ring sample). The solid ring samples had an outer diameter of 50 mm, an inner diameter of 43 mm, and was about 6.3 mm thick. The solid cylindrical samples had the dimensions of 92 mm×10 mm. All samples were manufactured on EOS machines by Citim GmbH, Barleben, Germany. The solid cylinder samples were used for DC tests, and the solid ring samples and the laminated spiral samples for AC tests. All electromagnetic tests were conducted using a REMAGRAPH® C-500 at Magnet-Physik, Köln, Germany.

A commercially available FeCo alloy (Vacoflux 50, commercially available from VACUUMSCHMELZE GmbH & Co. KG, Hanau, Germany) was used as a comparative example. The alloy was rolled into a sheet and heat treated at 850° C. for 1 hour. This heat-treated sample was used as Comparative Sample 1. Additively-manufactured FeCoSi cylindrical samples that were not subjected to any heat-treatment were used as Comparative Sample 2. Additively-manufactured FeCoSi helical spring samples that were not subjected to any heat-treatment were used as Comparative Sample 3.

Samples measuring 5 mm×5 mm were cut from the additively-manufactured spiral samples for heat treatment. The additively-manufactured solid ring and cylindrical samples were heat-treated as such. All the samples were heat-treated in vacuum or argon-2.9% hydrogen forming gas in a furnace with heating elements. The additively-manufactured spring and cylindrical samples were heat-treated at 750° C. and 850° C. for 4 hours. These heat-treated cylindrical samples were used as Comparative Sample 4 and the heat-treated spring samples were used as Comparative Sample 5. The additively-manufactured spring and cylindrical samples were also heat-treated at higher temperatures in the range from 1025° C. to 1100° C. for a time duration in a range of 2 to 4 hours. The heat treatment was either isothermal or cyclic. For cyclic heat-treatment, a 3-cycle 'cyclic' heat-treatment between 900° C. and 1025° C. with 5 min at each temperature and heating/cooling rates of 5° C./min was employed. The additively-manufactured spring samples that were isothermally heat-treated at 1100° C. for 4 hours were used as Sample 1. The additively-manufactured cylindrical samples that were isothermally heat-treated at 1100° C. for 4 hours were used as Sample 2. Table 1 provides the component characteristics and heat treatment conditions for different samples described herein.

TABLE 1

Component characteristics and heat treatment conditions for different samples

| Sample | Component Characteristics | Heat treated | Heat treatment conditions |
|---|---|---|---|
| Comparative Sample 1 | Commercially available Vacoflux 50 FeCo alloy rolled into a sheet | Yes | Isothermal heat treatment at 850° C. for 1 hour |
| Comparative Sample 2 | Additively-manufactured FeCoSi cylindrical sample | No | |
| Comparative Sample 3 | Additively-manufactured FeCoSi spring sample | No | |
| Comparative Sample 4 | Additively-manufactured FeCoSi cylindrical sample | Yes | Isothermal heat treatment at 850° C. for 4 hours |
| Comparative Sample 5 | Additively-manufactured FeCoSi spring sample | Yes | Isothermal heat treatment at 850° C. for 4 hours |
| Sample 1 | Additively-manufactured FeCoSi spring sample | Yes | Isothermal heat treatment at 1100° C. for 4 hours |
| Sample 2 | Additively-manufactured FeCoSi cylindrical sample | Yes | Isothermal heat treatment at 1100° C. for 4 hours |

Post heat-treatment, the samples were sectioned and metallographically polished for microstructure characterization. Microstructure characterization was conducted using scanning electron microscopy (SEM), transmission electron microscopy (TEM), and electron backscatter detector analysis (EBED).

SEM micrographs for the heat-treated rolled sheet of Vacoflux 50 (Comparative Sample 1) showed a more uniform grain structure with median grain size in the range of 50-100 μm. SEM micrographs of as-formed additively-manufactured cylindrical samples (Comparative Sample 2) and additively-manufactured spring samples (Comparative Sample 3) showed elongation of grains. Nearly bi-modal distribution (small and large grain clusters) were also observed, although the microstructure was largely equiaxed. The median grain size was less than 5-10 μm. Even after heat-treating the additively-manufactured samples at 850° C. for 4 hours (Comparative Samples 4 and 5), no significant increase in the grain size was observed. However, heat-treating the additively-manufactured samples at 1100° C. for 4 hours (Samples 1 and 2), led to significant recrystallization and grain growth in the γ-austenite phase. The heat treatment temperature of 1100° C. was significantly higher than the ferrite-to-austenite transition temperature. However, in contrast to Comparative Sample 1, a wide variation in grain size population was observed in Sample 1, which included a larger fraction of large-grains and a small fraction of small-grain clusters. While the median grain size was still below 50 μm, a good fraction of the sample did exhibit larger grains with grain size between 50-100 μm.

Figure 4:
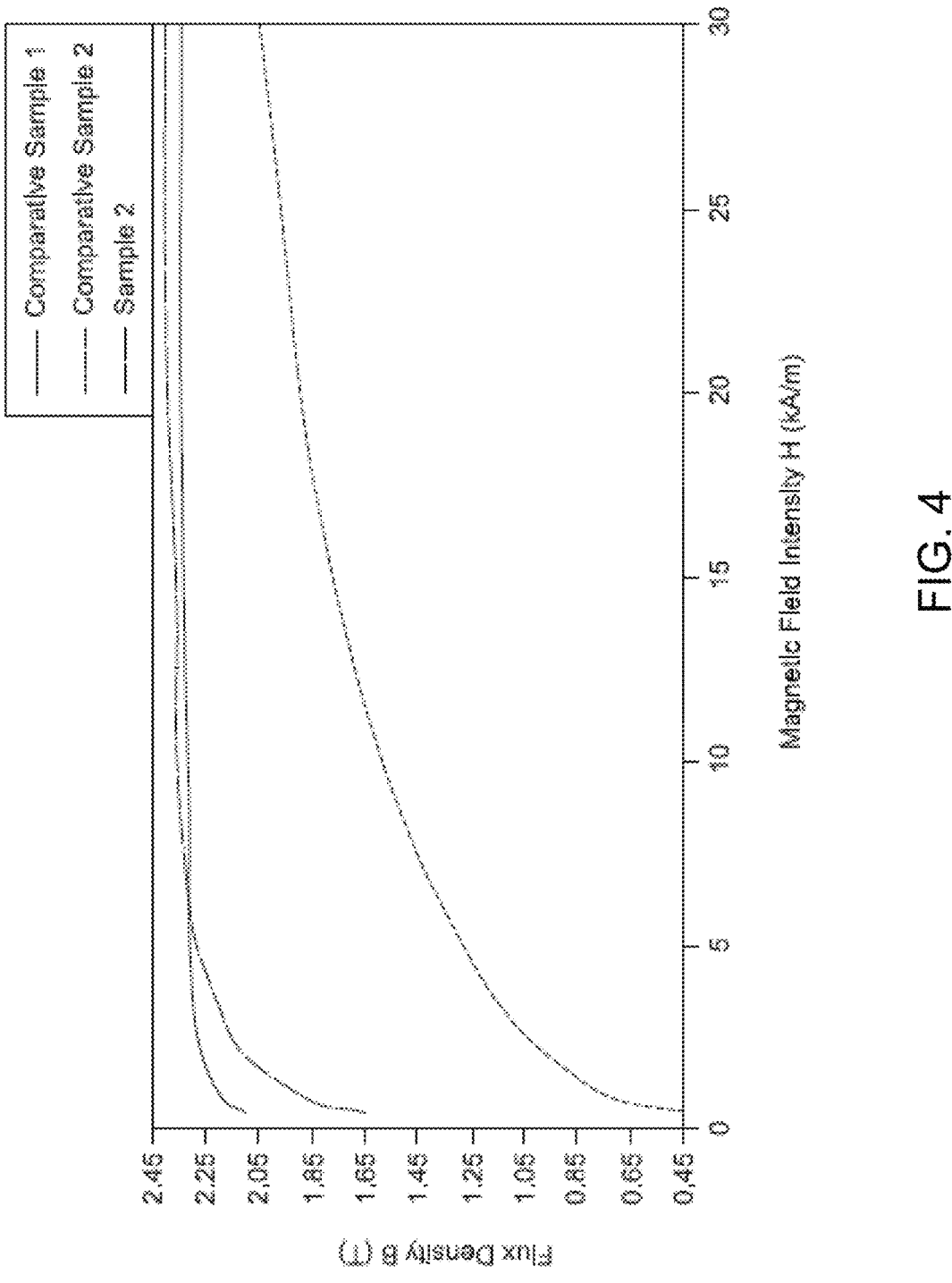
FIG. 4 shows the direct current (DC) magnetization curves for commercially available heat-treated Vacoflux 50 sample (Comparative Sample 1), as-formed additively-manufactured cylindrical sample (Comparative Sample 2), and heat-treated additively-manufactured cylindrical sample (Sample 2)

The magnetic properties for the samples prepared in accordance with embodiments of the disclosure as well as for the comparative samples were also measured. FIG. 4 shows the direct current (DC) magnetization curves, also referred to as DC BH curves, where B represents the flux density in Tesla and H represents magnetic field strength in kA/m. FIG. 4 shows the DC BH curves for commercial available heat-treated Vacoflux 50 sample (Comparative Sample 1), as-formed additively-manufactured cylindrical sample (Comparative Sample 2), and heat-treated additively-manufactured cylindrical sample (Sample 2). As shown in FIG. 4, the saturation flux density of the additively-manufactured cylindrical sample increased from 1.6 Tesla (Comparative Sample 2) to 2.35 Tesla (Sample 2), after the heat treatment. Further, the saturation flux density (BH) curve of the additively-manufactured cylindrical sample (Sample 2) almost matched that of heat-treated non-additively manufactured Vacoflux 50 (Comparative Sample 1).

FIG. 5 shows the relative permeability curves for commercial available heat-treated Vacoflux 50 sample (Comparative Sample 1), as-formed additively-manufactured cylindrical sample (Comparative Sample 2), and heat-treated additively-manufactured cylindrical sample (Sample 2). As shown in FIG. 5, the unsaturated relative permeability of the additively-manufactured cylindrical sample increased from 700 (Comparative Sample 2) to 2600 (Sample 2), after the heat treatment. Further, the relative permeability curve of the additively-manufactured cylindrical sample (Sample 2) almost matched that of heat-treated non-additively manufactured Vacoflux 50 (Comparative Sample 1).

FIG. 6 shows the static hysteresis loop shapes for as-formed additively-manufactured cylindrical sample (Comparative Sample 2) and heat-treated additively-manufactured cylindrical sample (Sample 2). The comparison of the curves indicates a reduction in hysteresis loop area for Sample 2 leading to a reduction in hysteresis losses, which is reflected in lower specific iron losses [W/kg] at the lower frequency range (hysteresis loss~frequency). Similar results were also observed for the ring and helical spring samples.

Thus, inventors of the present application have unexpectedly found a heat-treatment procedure that results in improvement in ferromagnetic properties despite the formation of an irregular microstructure.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present disclosure. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A heat-treated ferromagnetic component for an electric generator, comprising:
   a plurality of grains such that at least 25% of the plurality of grains have a median grain size less than 10 microns and 25% of the plurality of grains have a median grain size greater than 25 microns,
   wherein the plurality of grains have an overall median grain size in a range from about 10 microns to about 25 microns.

2. The heat-treated ferromagnetic component of claim 1, wherein the heat-treated ferromagnetic component has a unitary structure and a saturation flux density greater than 2 Tesla.

3. The heat-treated ferromagnetic component of claim 1, wherein the heat-treated ferromagnetic component comprises a metal alloy comprising iron and cobalt.

4. The heat-treated ferromagnetic component of claim 3, wherein the metal alloy further comprises silicon, vanadium, or a combination thereof.

5. The heat-treated ferromagnetic component of claim 1, wherein an unsaturated relative permeability of the heat-treated ferromagnetic component is greater than 2500.

6. The heat-treated ferromagnetic component of claim 1, wherein the heat-treated ferromagnetic component has an overall median grain size greater than or equal to 20 microns and less than or equal to 25 microns.

7. The heat-treated ferromagnetic component of claim 1, wherein different portions of the heat-treated ferromagnetic component define distinct saturation flux density and tensile strength values.

8. A heat-treated ferromagnetic component for an electric generator, comprising:
   a plurality of grains such that at least 25% of the plurality of grains have a median grain size less than 10 microns and 25% of the plurality of grains have a median grain size greater than 25 microns,
   wherein the plurality of grains have an overall median grain size in a range from about 10 microns to about 25 microns,
   wherein the heat-treated ferromagnetic component has a unitary structure and a saturation flux density greater than 2 Tesla, and
   wherein different portions of the heat-treated ferromagnetic component define distinct saturation flux density and tensile strength values.

9. The heat-treated ferromagnetic component of claim 8, wherein an unsaturated relative permeability of the heat-treated ferromagnetic component is greater than 2500.

10. The heat-treated ferromagnetic component of claim 8, wherein the electric generator is coupled to an engine of an aircraft.

11. The heat-treated ferromagnetic component of claim 10, wherein the electric generator comprises:
   a rotor assembly including a rotor core mounted on a shaft; and
   a stator assembly including a stator core,
   wherein the rotor core includes the heat-treated ferromagnetic component.

12. The heat-treated ferromagnetic component of claim 8, wherein the electric generator is coupled to an engine of an aircraft.

13. The heat-treated ferromagnetic component of claim 12, wherein the electric generator comprises:
   a rotor assembly including a rotor core mounted on a shaft; and
   a stator assembly including a stator core,
   wherein the rotor core includes the heat-treated ferromagnetic component.

* * * * *